United States Patent
Bauters et al.

(10) Patent No.: US 12,164,126 B2
(45) Date of Patent: Dec. 10, 2024

(54) HIGH BANDWIDTH PHOTONIC INTEGRATED CIRCUIT WITH ETALON COMPENSATION

(71) Applicant: OpenLight Photonics, Inc., Goleta, CA (US)

(72) Inventors: Jared Bauters, Santa Barbara, CA (US); Gregory Alan Fish, Santa Barbara, CA (US); Erik Johan Norberg, Santa Barbara, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 722 days.

(21) Appl. No.: 17/363,045

(22) Filed: Jun. 30, 2021

(65) Prior Publication Data

US 2023/0003926 A1    Jan. 5, 2023

(51) Int. Cl.
G02B 6/34     (2006.01)
G02B 5/18     (2006.01)
G02B 6/13     (2006.01)

(52) U.S. Cl.
CPC ......... *G02B 5/1866* (2013.01); *G02B 5/1857* (2013.01); *G02B 6/13* (2013.01); *G02B 6/34* (2013.01)

(58) Field of Classification Search
CPC ....................................................... G02B 6/34
See application file for complete search history.

(56) References Cited

U.S. PATENT DOCUMENTS

| | | | |
|---|---|---|---|
| 5,144,524 A * | 9/1992 | Tullis | G01N 21/94 356/243.4 |
| 6,580,095 B2 * | 6/2003 | Tani | H01L 27/14698 257/435 |
| 10,451,801 B2 * | 10/2019 | Pinguet | G02B 6/124 |
| 2004/0156589 A1 | 8/2004 | Gunn et al. | |
| 2015/0086149 A1 | 3/2015 | Zheng et al. | |
| 2015/0140720 A1 * | 5/2015 | Collins | G02B 6/13 438/65 |
| 2016/0109659 A1 | 4/2016 | Jiang | |
| 2016/0131837 A1 * | 5/2016 | Mahgerefteh | G02B 6/124 385/14 |

(Continued)

FOREIGN PATENT DOCUMENTS

| | | |
|---|---|---|
| CN | 111175896 | 5/2020 |
| CN | 115542460 | 12/2022 |

(Continued)

OTHER PUBLICATIONS https://www.soitec.com/en/products/smart-cut (Smartcut process from Soitec.com referenced to by US 20150140720 A1) (Year: 2015).*

(Continued)

*Primary Examiner* — Charlie Y Peng
(74) *Attorney, Agent, or Firm* — Schwegman Lundberg & Woessner, P.A.

(57) ABSTRACT

A photonic integrated circuit device can comprise one or more layers having different refraction indices that cause optical coupling issues and losses from layer variations. A film of material can be applied to a layer of the photonic integrated circuit to avoid the issues to increase the optical bandwidth of the photonic integrated circuit device and decrease sensitivity to manufacturing and design processes.

18 Claims, 7 Drawing Sheets

(56) References Cited

U.S. PATENT DOCUMENTS

| | | | |
|---|---|---|---|
| 2018/0188459 A1 | 7/2018 | Mekis et al. | |
| 2018/0335566 A1* | 11/2018 | Menezo | G02B 6/34 |
| 2021/0193564 A1 | 6/2021 | Song et al. | |

FOREIGN PATENT DOCUMENTS

| | | |
|---|---|---|
| JP | 2015121787 | 7/2015 |
| JP | 2017103460 | 6/2017 |
| JP | 2017524961 | 8/2017 |
| JP | 7187623 | 12/2022 |
| KR | 20150070096 | 6/2015 |
| KR | 20170054254 | 5/2017 |
| KR | 20170081265 | 7/2017 |
| TH | 2101004774 | 2/2023 |
| TW | 202024698 | 7/2020 |
| TW | 202304012 | 1/2023 |
| TW | I807389 | 7/2023 |
| WO | 2015139200 | 9/2015 |
| WO | 2017126386 | 7/2017 |

OTHER PUBLICATIONS

"European Application Serial No. 21189876.2, Extended European Search Report mailed Nov. 18, 2021", 8 pgs.

"Taiwanese Application Serial No. 110129563, Response filed Oct. 25, 2022 to Office Action mailed Jul. 22, 2022", With English machine translation, Claims not amended; response filed Oct. 25, 2022, 17 pgs.

"Korean Application Serial No. 10-2021-0103878, Notice of Preliminary Rejection mailed Dec. 6, 2023", W English Translation, 14 pgs.

"Korean Application Serial No. 10-2021-0103878, Response filed Jan. 29, 2024 to Notice of Preliminary Rejection mailed Dec. 6, 2023", w English claims, 16 pgs.

"Japanese Application Serial No. 2021-122251, Notification of Reasons for Refusal mailed Jun. 28, 2022", With English machine translation, 11 pgs.

"Taiwanese Application Serial No. 110129563, Office Action mailed Jul. 22, 2022", With English machine translation, 9 pgs.

Nivesh, Mangal, "Performance Evaluation of Backside Emitting 0-Band Grating Couplers for 100-zm-Thick Silicon Photonics Interposers", IEEE Photonics Journal vol. 11, No. 3,, (Jun. 2019), 12 pgs.

"Chinese Application Serial No. 202110912404.8, Voluntary Amendment filed Apr. 19, 2023", w English claims, 10 pgs.

"European Application Serial No. 21189876.2, Response filed Jul. 3, 2023 to Extended European Search Report mailed Nov. 18, 2021", 7 pgs.

\* cited by examiner

HIGH BANDWIDTH PHOTONIC INTEGRATED CIRCUIT WITH ETALON COMPENSATION

TECHNICAL FIELD

The present disclosure generally relates to optical and electrical devices and more particularly to efficient and scalable optical structures with anti-reflective coatings.

BACKGROUND

Generally, silicon photonic integrated circuits can implement an optical coupling to output light generated by the circuit, detect light received by the circuit, or otherwise process light within the circuit. The physical properties (e.g., index of refraction) and physical dimensions of the materials used to construct the photonic circuits can result in inefficient designs or designs that are efficient but difficult to manufacture due to manufacturing variations and design layouts.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Figure 1:
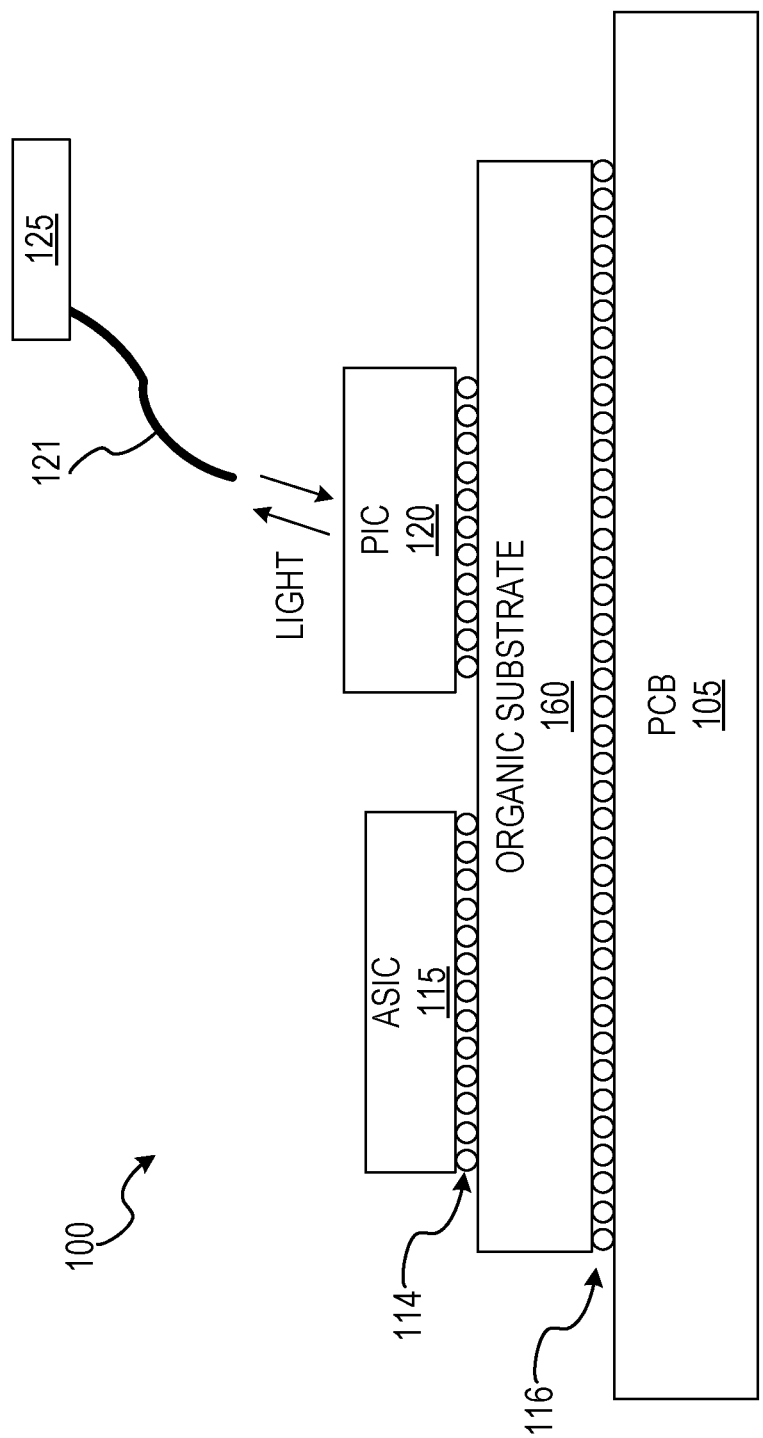
FIG. 1 is a diagram showing a side view of an optical-electrical device, according to some example embodiments.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As discussed, silicon photonic (SiPh) integrated circuits can implement an optical coupling to output light generated by the circuit, detect light received by the circuit, or otherwise process light within the circuit. In some example embodiments, the optical coupling interface is located at the edge of the silicon photonic integrated circuit chip, or within the plane of light propagation on the silicon photonic integrated circuit chip. In some example embodiments, the optical coupling is placed approximately or precisely normal to the plane of light propagation in the silicon photonic integrated circuit chip. In these approaches, the light in the PIC can be turned upward or downward with an optical component in the PIC, such as a mirror and/or a grating coupler. In implementing the optical turning component, the overall efficiency of the optical coupling interface can depend on the properties (e.g. thickness, refractive index, shape, etc.) of the materials existing between the light-turning component on the SiPh IC and the component with which the SiPh IC is interfacing (e.g. an optical fiber, an off-chip laser, an off-chip detector, etc.). SiPh ICs can be fabricated using silicon-on-insulator (SOI) substrates, where the high-index-contrast between the buried oxide and the silicon substrate can impact the overall efficiency of the optical coupling interface. In particular, for example, light can be reflected by the silicon-dioxide/silicon interface, and the reflection can decrease the coupling efficiency, increase the manufacturing process sensitivities, and limit bandwidths that are usable in a given chip design (due to the decreased coupling efficiency and manufacturing sensitivities). This decreased wavelength performance further limits the number of lanes that can be added to a chip (e.g., such as a course wavelength division chip having a plurality of sequential lanes that are spaced 20-40 nm apart). While edge couplings or turning components that direct light away from the SOI silicon substrate can mitigate these issues, turning light away is not practical as a design limitation in many layouts (e.g., an edge coupler design may turn light away, however edge coupled designs have space limitations and/or may not be the preferred layout of a given optical structure, such as in flip-chip PICs).

In some example embodiments, multiple silicon wafers can be processed to form an SOI with one or more anti-reflective coatings to increase efficiency and reduce manufacturing sensitivity of the structures. In an example processing, a surface of one wafer (Wafer A) is thermally oxidized to form a buried oxide. Further, a weakened interface can be created within the top silicon of Wafer A, via a process such as implantation. Wafer A is then flipped and bonded onto another wafer, Wafer B. The bonded structure is separated at the weakened silicon interface, which leaves an SOI wafer comprising the silicon substrate of Wafer B, the buried thermal oxide from Wafer A, and a thin device silicon layer from Wafer A (e.g., that interfaces with a device, such as the organic substrate 160 or optical fiber 121). The SOI wafer is commonly annealed and the device silicon layer is polished.

In some example embodiments, an anti-reflection (AR) coating is added between the buried oxide and silicon substrate of the SOI wafer. In some example embodiments, the AR coating is a thin film that is deposited on Wafer B before bonding with Wafer A. Alternatively, and in accordance with some example embodiments, the thin film is deposited on Wafer A after oxidation of Wafer A, which is then bonded with Wafer B. Further, in some example embodiments, the thickness of the deposited film is close to or exactly a quarter-wavelength of the light to be transmitted through the film (e.g., light received by the PIC from an external source, generated by the PIC using an internal light source, or processed by the PIC) such that the interference at the coating interface is exactly out of phase (e.g., interference from reflections at the top and bottom of the interfaces of the coating). Further, to yield a good fringe from the interference due the AR coating (e.g., from perfect amplitude and subtraction of the waves at the AR coating interfaces), the deposited film is of a material that has a refractive index near the geometric mean of the materials on either side of the coating. For example, if the two interfacing materials are a buried oxide layer and a silicon layer, the AR coating can be a film of a silicon nitride material (e.g., Si3N4), which has an index that is close to the geometric mean of the indices of the buried oxide and silicon materials. In this way, the AR coating can compensate in cases where the buried oxide thickness is not ideal (e.g., intentionally polished down, random manufacturing process variation), and further relaxes the wavelength sensitivity and manufacturing sensitivity thereby enabling broadband wavelength performance (e.g., lower loss over a wider wavelength band) and in turn enabling designs with additional lanes.

FIG. 1 shows a side view of an optical-electrical device 100 including one or more optical devices, according to some example embodiments. In illustrated embodiment, the optical-electrical device 100 is shown to include a printed circuit board (PCB) substrate 105, organic substrate 160, an application-specific integrated circuit 115 (ASIC) and photonic integrated circuit 120 (PIC).

In some example embodiments, the PIC 120 includes silicon on insulator (SOI) or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, as electron speed in III-V semiconductors is much faster than that in silicon. In addition, III-V materials have a direct bandgap, which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic (MO) materials allow heterogeneous PICs to operate based on the MO effect. Such devices may utilize the Faraday Effect, in which the magnetic field associated with an electrical signal modulates an optical beam, offering high bandwidth modulation, and rotates the electric field of the optical mode, enabling optical isolators. Said MO materials may comprise, for example, materials such as iron, cobalt, or yttrium iron garnet (YIG). Further, in some example embodiments, crystal substrate materials provide heterogeneous PICs with a high electro-mechanical coupling, linear electro-optic coefficient, low transmission loss, and stable physical and chemical properties. Said crystal substrate materials may comprise, for example, lithium niobate (LiNbO3) or lithium tantalate (LiTaO3).

In the example illustrated, the PIC 120 exchanges light with an external light source 125 via an optical fiber 121, in a flip-chip configuration where a top-side of the PIC 120 is connected to the organic substrate and light propagates out (or in) from a bottom-side of the PIC 120 facing away (e.g., towards a coupler), according to some example embodiments. The optical fiber 121 can couple with the PIC 120 using a prism, grating, or lens, according to some example embodiments. The optical components of PIC 120 (e.g., optical modulators, optical switches) are controlled, at least in part, by control circuitry included in ASIC 115. Both ASIC 115 and PIC 120 are shown to be disposed on copper pillars 114, which are used for communicatively coupling the PICs via organic substrate 160. PCB substrate 105 is coupled to organic substrate 160 via ball grid array (BGA) interconnect 116 and may be used to interconnect the organic substrate 160 (and thus, ASIC 115 and PIC 120) to other components of the optical-electrical device 100 not shown (e.g., interconnection modules, power supplies, etc.).

Figure 2:
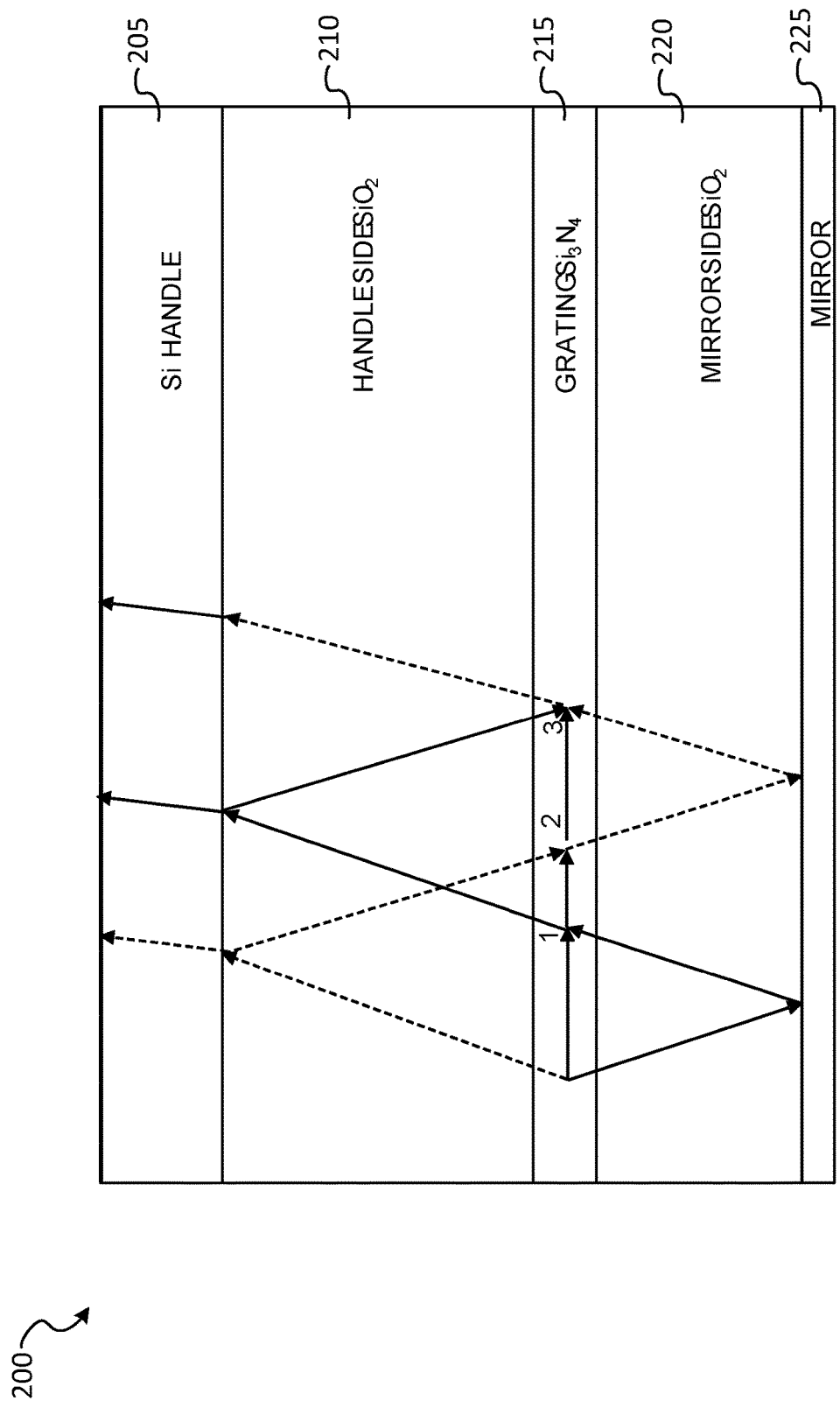
FIG. 2 is a diagram showing an example photonic integrated circuit structure, according to some example embodiments.

FIG. 2 shows an example photonic integrated circuit structure 200 (e.g., photonic integrated circuit 120), according to some example embodiments. An etalon is an optical cavity formed from two reflective interfaces (e.g., Fabry-Perot Interferometer) that can depend on the dimensions of the cavity and the reflective indices of the materials. In FIG. 2, light is illustrated as ray arrows (dotted arrows, solid arrows). In the illustrated example, the grating layer 215 is between a first oxide layer 210 (e.g., handleside buried oxide layer) and a second oxide layer 220 (e.g., mirrorside buried oxide layer), and light can propagate out from the through a silicon layer 205 (e.g., a bottom side of PIC 120 facing towards an external coupler). Light can be generated, received, or otherwise processed by the photonic integrated circuit structure 200 vertically (e.g., with respect to the orientation of FIG. 2) in a flip-chip configuration. For example, the light can be generated by an integrated light source (e.g., not depicted in FIG. 2), propagate through and emanate from the grating layer 215, towards the mirror 225 which reflects the light such that it propagates through the second oxide layer 220, the grating layer 215, the first oxide layer 210, and exits from the silicon layer 205 (e.g., to an external device, such as a fiber optical coupler).

In the example illustrated in FIG. 2, an unintended etalon can occur in the structure 200 from reflections between different surfaces. For example, an etalon can occur from reflections from an interface made by the silicon layer 205 and the first oxide layer 210 and reflections from the mirror 225. As an additional example, an etalon can occur from reflections from an interface made by the silicon layer 205 and the first oxide layer 210 and reflections from another interface made by the first oxide layer 210 and the grating layer 215. As a further example, an etalon can occur from reflections from an interface made by the grating layer 215 and the second oxide layer 220, and the mirror 225. In some example embodiments, the etalons are unintended can result from manufacturing variations. For example, the first oxide layer 210 can be further etched and then polished (according to a given PIC layout design) and the variations in polishing can create variations in thickness of the first oxide layer 210, which result in one or more of the above etalons.

Figure 3:
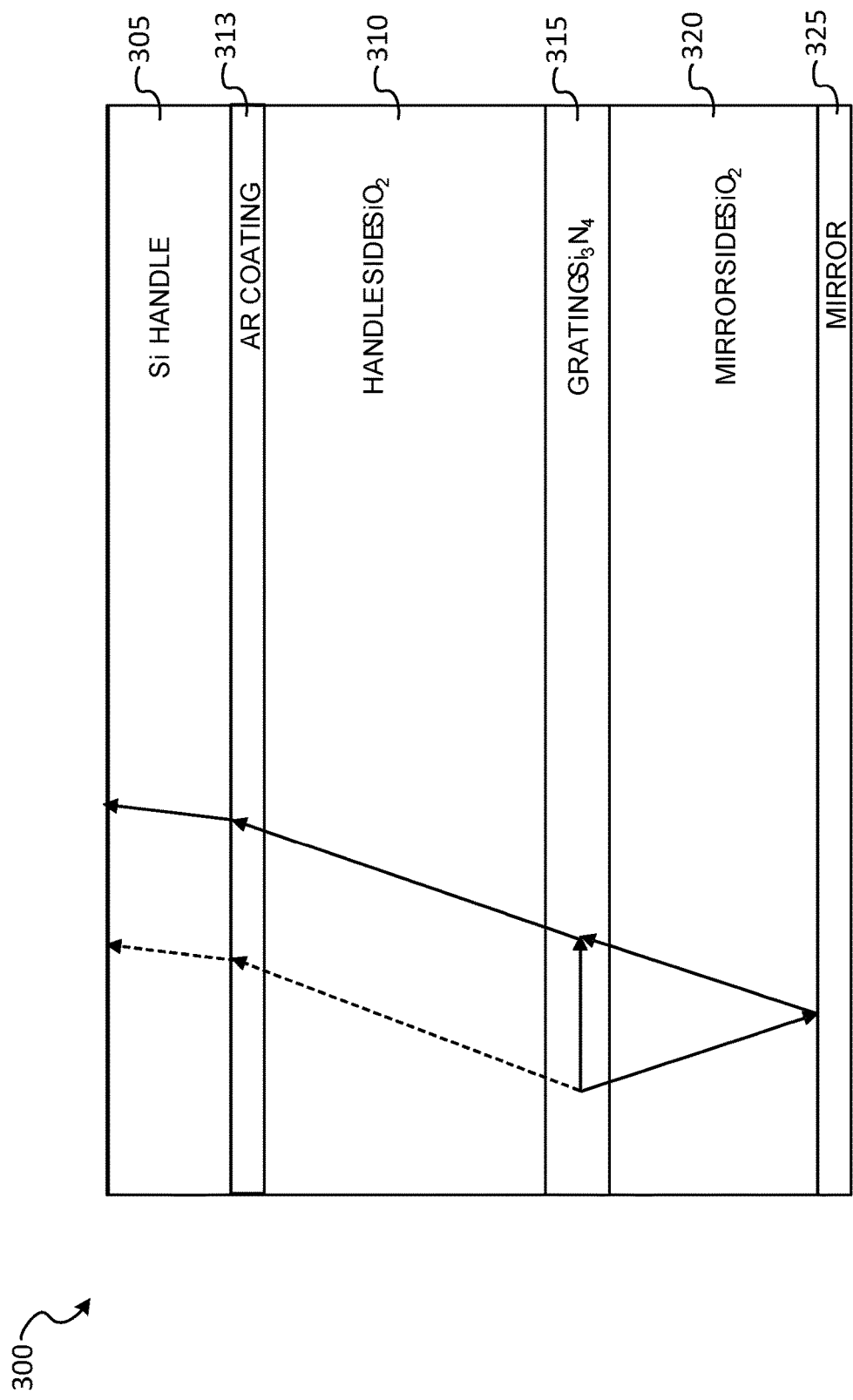
FIG. 3 is a diagram showing an example photonic integrated circuit structure formed from wafers, according to some example embodiments.

FIG. 3 shows an example photonic integrated circuit structure 300 (e.g., photonic integrated circuit 120) formed from wafers (e.g., Wafer A, Wafer B), according to some example embodiments. In FIG. 3, light is illustrated as ray arrows (e.g., dotted arrows, solid arrows). In some example embodiments, the silicon layer 305 and the AR coating 313 are formed using Wafer B, and the first oxide layer 310, the grating layer 315, the second oxide layer 320, and the mirror layer 325 are formed on Wafer A or using Wafer A (e.g., implantation separation to create the second oxide layer 320). Light can be generated, received, or otherwise processed by the photonic integrated circuit structure 300 vertically (e.g., with respect to the orientation of FIG. 3). For example, the light can be generated by an integrated light source (e.g., not depicted in FIG. 3) and directed from the grating through the first oxide layer 310, or downwards to reflect on the mirror layer 325 and up through the mirror layer 325, the grating layer 315, the first oxide layer 310, the AR coating 313, and the silicon layer 305 (e.g., to an external device, such as a fiber optical coupler). In the example illustrated in FIG. 3, the photonic integrated circuit structure 300 includes an AR coating 313 that can be applied to one of the wafers before bonding to avoid one or more etalons in the photonic integrated circuit structure 300 (e.g., by removing the full length round trip that creates the etalon), thereby reducing the manufacturing sensitivity of the photonic integrated circuit structure 300. For instance, in particular, if the first oxide layer 310 is over-polished in the manufacturing process, the AR coating 313 will stop one or more etalons from arising in the photonic integrated circuit structure 300. Additionally, the wavelength span of light to be propagated can be increased (e.g., for additional lanes) due to avoided sensitivities for potential etalons arising within the photonic integrated circuit structure 300.

In some example embodiments, the grating layer 315 comprises a broadband turning mechanism (e.g., total internal reflection (TIR) grating, turning mirror) that turns light in the grating layer 315 ninety degrees towards the interface between the silicon layer 305 and the first oxide layer 310. In these example embodiments, the addition of the AR coating 313 between the silicon layer 305 and the first oxide layer 310 removes the etalon effect, thus the overall bandwidth of the device is set by the AR coating 313 removing the one or more etalons (e.g., as the turning mirror in this embodiment is very broadband and has a wide bandwidth that is limited by a possible etalon at interface of the silicon layer 305 and the first oxide layer 310).

Figure 4:
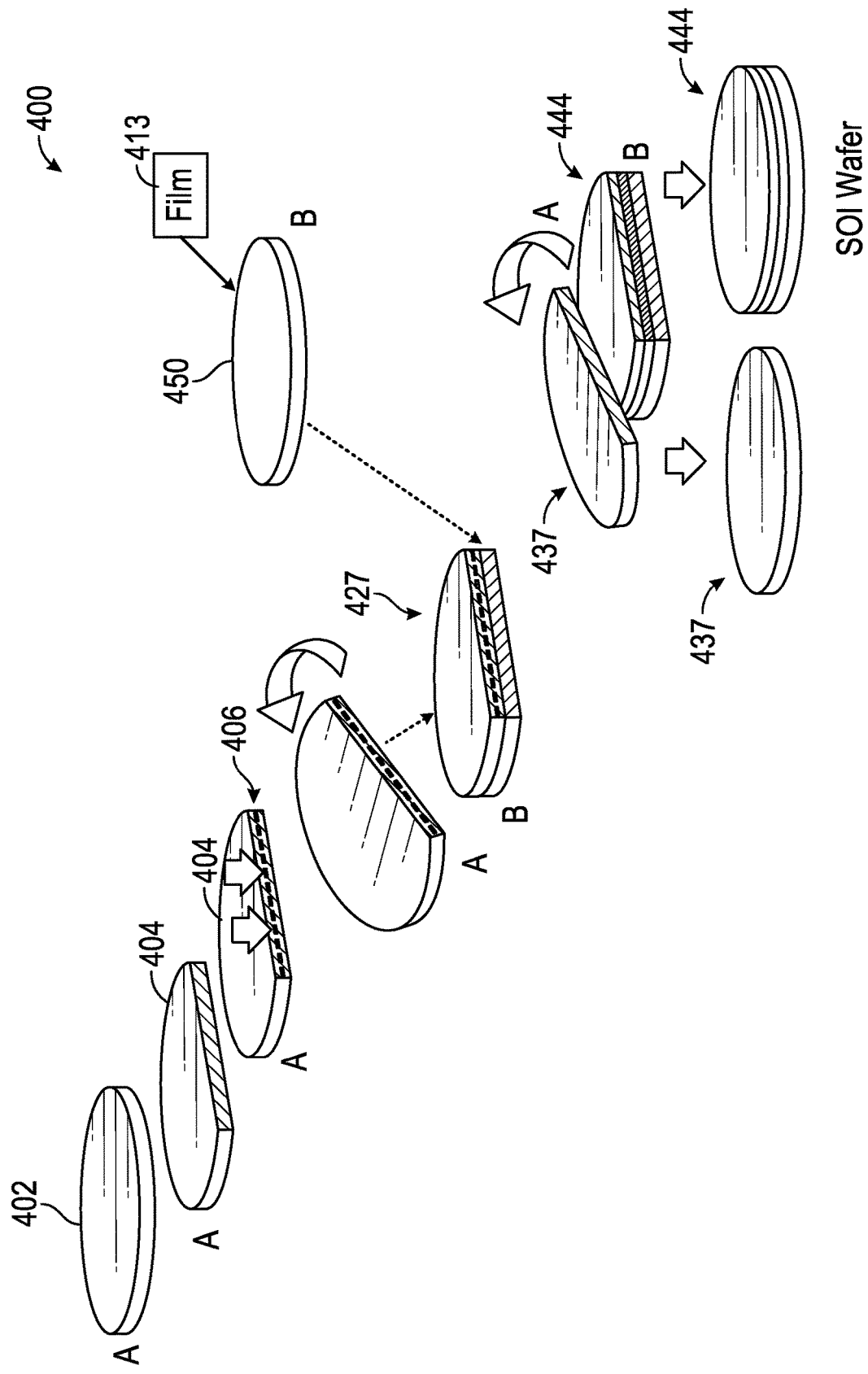
FIG. 4 is a representative diagram showing a process architecture for manufacturing photonic structure having one or more coatings to increase optical bandwidth and decrease physical sensitivities, according to some example embodiments.

FIG. 4 shows a process architecture 400 for manufacturing SOIs with AR coatings to reduce wavelength and manufacturing sensitivity, according to some example embodiments. In some example embodiments, the Wafer A 402 is oxidized to generate an oxidized Wafer A 405. The oxidized Wafer A 405 then undergoes interface weaking, e.g., using ion implantation to create a weak interface 406 for later separation.

In the illustrated embodiment of FIG. 4, a thin film of material 413 is applied to Wafer B 450 to function as an AR coating as discussed above. For example, a thin film (e.g., 164 nm) of silicon nitride (Si3N4) can be applied via thin film deposition (e.g., chemical vapor deposition, growth deposition, physical vapor deposition) to create the AR coating 313 (FIG. 3). The thin film is selected as a material of a certain index (e.g., a geometric mean of the two materials on either side of the coating, a mean of the index of silicon and silicon dioxide, etc.). Further, the film is deposited at a certain thickness (e.g., a quarter-wavelength of the light to propagate through the coating), for instance, to ensure that the two reflections of the potential etalon remain perfectly out of phase, and further to ensure the waves have equal magnitude (e.g., to yield a good fringe from interference), the thin film of material is selected to ensure that it has an index of refraction between the two refractive indexes being matched (silicon and BOX), such that the amplitude matches between the two reflected waves and the reflection is completely subtracted and the etalon does not occur. In accordance with some example embodiments, the index of the film is selected to the geometric mean (e.g., or near to the mean) of the two refractive indexes being matched (silicon and BOX), such that the amplitude matches between the two reflected waves and the reflection is completely subtracted and the etalon does not occur. Additionally, in some example embodiments, the thin film is applied to Wafer A instead of Wafer B. For example, the Wafer A can be oxidized, and the thin film can be applied to the surface of Wafer A that is bonded to the Wafer B.

Continuing, the wafer A is then flipped over and bonded to Wafer B to create bonded structure 427. Wafer A is then separated at the weak interface 406 to create a new Wafer A which can be used as a doner wafer for additional SOI creation. Further, the separation at the thin interface creates silicon on insulator structure 444 (e.g., the photonic integrated circuit structure 300, FIG. 3).

Figure 5:
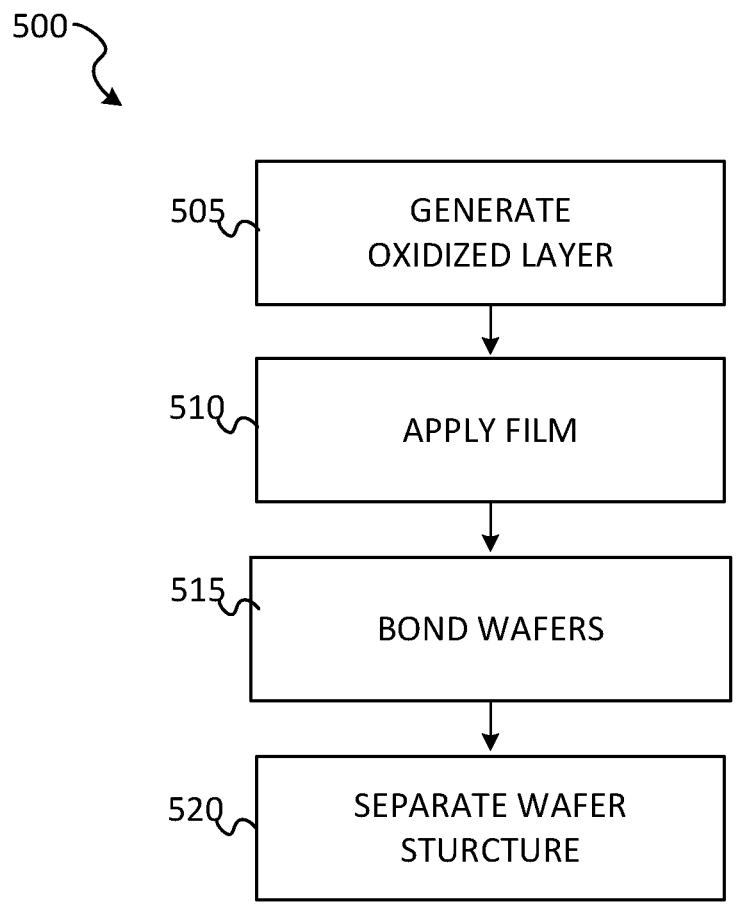
FIG. 5 shows a flow diagram of a method for manufacturing a high optical bandwidth photonic structure, according to some example embodiments.

FIG. 5 shows a flow diagram of a method 500 for manufacturing a high optical bandwidth PIC having etalon pre-empting AR coatings to decrease wavelength and manufacturing sensitives, according to some example embodiments. At operation 505, one or more wafers are oxidized. For example, Wafer A or Wafer B (e.g., silicon wafers) is oxidized to produce buried oxide layers on the wafer.

At operation 510, a thin film is applied as an AR coating using film deposition processes (e.g., chemical vapor deposition). In some example embodiments, the index of the material of the film has a geometric mean of the two materials creating a reflective interface of an etalon. For example, the etalon interface can be created from a silicon material (e.g., the silicon layer 305) and a silicon oxide material (e.g., the first oxide layer 310) and a layer of silicon nitride is applied as a thin film to one of the wafers. In some example embodiments, the deposited film has an approximate quarter-wavelength of the light to be propagated through the PIC.

At operation 515, the wafers are bonded. For example, Wafer A is flipped and bonded to Wafer B. At operation 520, the wafer structure is separated. For example, a weak interface can be created in Wafer A (e.g., via implantation) and the Wafer A is split to create a new wafer and a resulting SOI structure, such as the photonic integrated circuit structure 300, FIG. 3.

Figure 6:
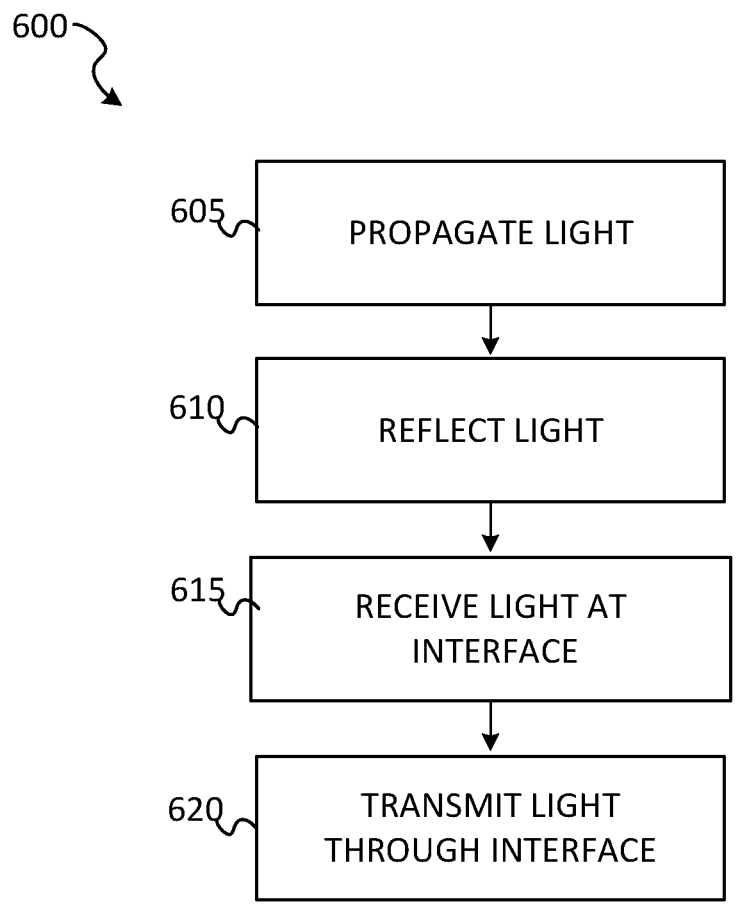
FIG. 6 shows a flow diagram of method for processing light using a high optical bandwidth PIC having etalon compensation to decrease wavelength and manufacturing sensitives, according to some example embodiments.

FIG. 6 shows a flow diagram of method 600 for processing light using a high optical bandwidth PIC having etalon compensation to decrease wavelength and manufacturing sensitives, according to some example embodiments. At operation 605, the photonic integrated circuit structure 300 propagates light. For example, light propagates out from the grating layer 315 toward the mirror layer 325 and further propagates light from the grating layer 315 towards the silicon layer 305 (e.g., a bottom-side of a flip-chip). At operation 610, the light is reflected. For example, the light is reflected from the mirror layer 325 in the direction of the silicon layer 305. At operation 615, the light is received at an interface of the 313, such as the interface of the silicon layer 305 and the first oxide layer 310. At operation 620, the light is transmitted through the interface without etalon based inefficiencies due to the AR coating 313, as discussed above.

Figure 7:
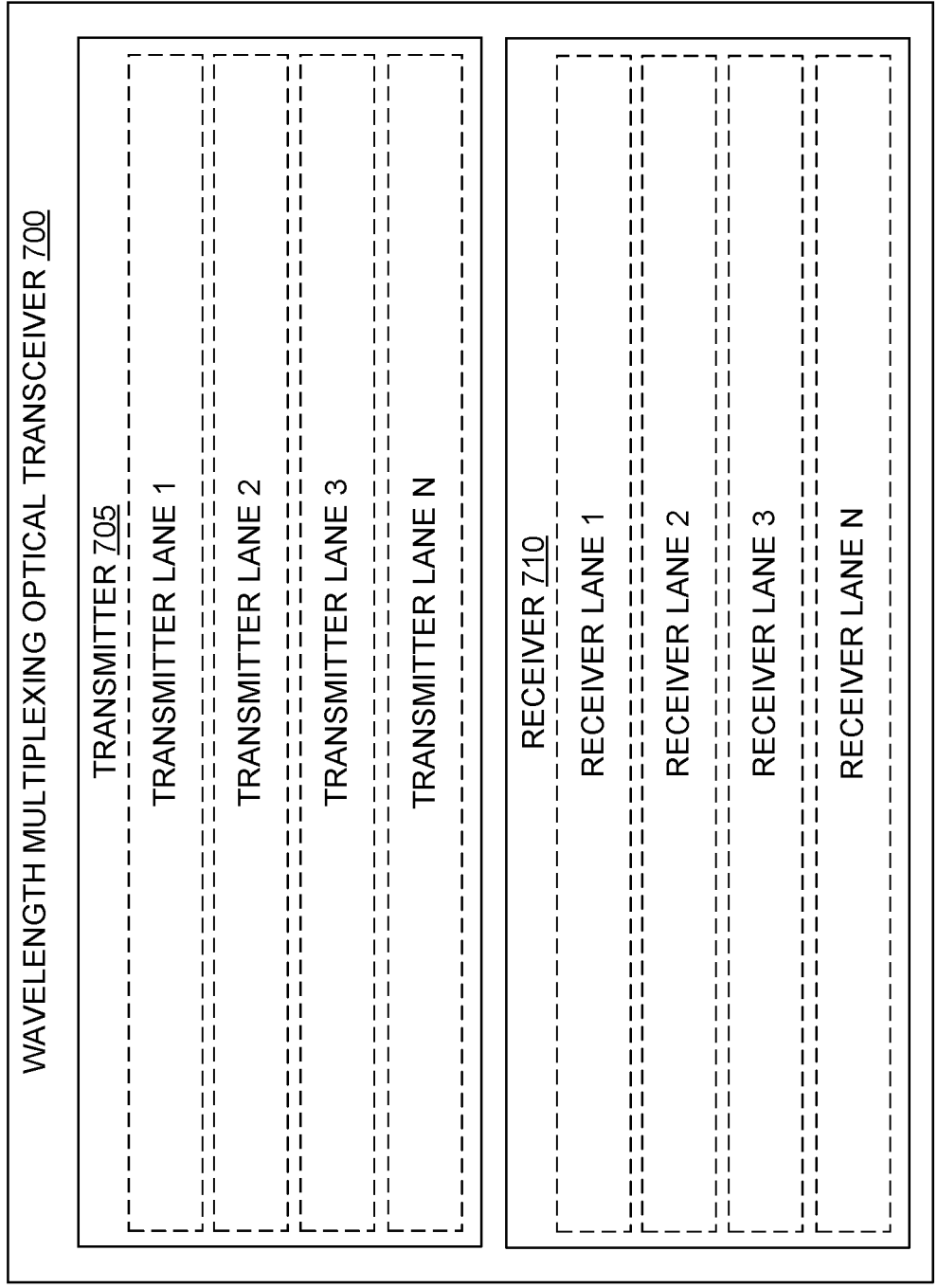
FIG. 7 shows an example optical transceiver, according to some example embodiments.

FIG. 7 shows an example multi-lane wavelength division multiplexing (WDM) optical transceiver 700, according to some example embodiments. In the illustrated embodiment, the optical transceiver 700 comprises an integrated photonic transmitter structure 705 and an integrated photonic receiver structure 710. In some example embodiments, the integrated photonic transmitter structure 705 and the integrated photonic receiver structure 710 are example optical components fabricated as a PIC device, such as PIC 120 of FIG. 1, discussed above. The integrated photonic transmitter structure 705 is an example of a WDM transmitter having four lanes, transmitter lanes 1-4, in which each lane handles a different wavelength of light. The integrated photonic receiver structure 710 is an example of a WDM receiver that receives WDM light (e.g., from an optical network or from the integrated photonic transmitter structure 705 in loopback mode). The integrated photonic receiver structure 710 can receive and process light by filtering, amplifying, and converting it to electrical signal using components such as multiplexers, semiconductor optical amplifiers (SOAs) and one or more detectors such as photodetectors (e.g., photodiodes).

The optical transceiver 700 is an example structure that can be formed from two wafers with the AR coating film as discussed above (e.g., Wafer A, Wafer B, FIG. 4). Due to the AR coating removing manufacturing sensitivities (e.g., unintentional etalons arising from over polishing the buried oxide), different wavelengths and additional lanes can be added to the optical transceiver 700. For example, the AR coating film can be added to a wafer used to form the optical transceiver and the AR coating has a geometric mean that is near silicon and buried oxide to remove an etalon from each of the lanes in the integrated photonic transmitter structure 705. For example, due to the increased bandwidth of the optical transceiver, additional transmitter lanes having smaller wavelengths can be added to enable greater bandwidth overall.

In some example embodiments, different films with different thicknesses can be implemented to compensate for different operating characteristics of the different lanes. For example, the area over transmitter lanes 1 and 2 may receive an AR coating having a thickness that is near the one-quarter wavelength of the light in transmitter lanes 1 and 2 (e.g., one-quarter wavelength of an average wavelength of the light propagating in lanes 1 and 2) of the different wavelengths of the. Further, an area over transmitter lanes 3 and 4 (or additional lanes 5 and 6, additional lanes 7 and 8 etc.) may receive an AR coating that is slightly thinner to correspond to the smaller wavelength(s) of light propagating in those lanes (e.g., for 8-lane WDM).

In view of the disclosure above, various examples are set forth below. It should be noted that one or more features of an example, taken in isolation or combination, should be considered within the disclosure of this application.

Example 1. A photonic integrated circuit structure for transmitting light comprising: a grating layer that propagates light, the grating layer being between a first oxide layer and a second oxide layer of the photonic integrated circuit structure; a mirror at a first side of the photonic integrated circuit structure, the mirror separated from the grating layer by the first oxide layer, the mirror to direct light from the grating layer towards a second side of the photonic integrated circuit structure that is opposite of the first side; a silicon layer at the second side of the photonic integrated circuit structure, the second oxide layer being between the silicon layer and the grating layer; and a film of material between the silicon layer and the second oxide layer to compensate for one or more etalons in the photonic integrated circuit structure, the film of material having an index of refraction that is between indices of refraction of the silicon layer and the second oxide layer.

Example 2. The photonic integrated circuit structure of example 1, wherein the index of refraction of the film of material is a geometric mean of the indices of refraction of the silicon layer and the second oxide layer.

Example 3. The photonic integrated circuit structure of any of examples 1 or 2, wherein the film of material has a thickness that is one-quarter of a wavelength of the light in the photonic integrated circuit structure.

Example 4. The photonic integrated circuit structure of any of examples 1-3, wherein the film of material stops an etalon from occurring between: a first interface comprising the silicon layer and the second oxide layer, and a second interface comprising the grating layer and the second oxide layer.

Example 5. The photonic integrated circuit structure of any of examples 1-4, wherein the film of material stops an etalon from occurring between: a reflective interface comprising the silicon layer and the second oxide layer, and the mirror.

Example 6. The photonic integrated circuit structure of any of examples 1-5, wherein the photonic integrated circuit structure is formed from a first silicon wafer and a second silicon wafer.

Example 7. The photonic integrated circuit structure of any of examples 1-6, wherein oxide material of the first oxide layer and the second oxide layer is created from oxidation of the first silicon wafer.

Example 8. The photonic integrated circuit structure of any of examples 1-7, wherein the film of material is deposited on the first silicon wafer after oxidation of the first silicon wafer.

Example 9. The photonic integrated circuit structure of any of examples 1-8, wherein the film of material is deposited on the second silicon wafer.

Example 10. The photonic integrated circuit structure of any of examples 1-9, wherein the photonic integrated circuit structure is formed by bonding the first silicon wafer to the second silicon wafer.

Example 11. The photonic integrated circuit structure of any of examples 1-10, wherein the first silicon wafer is separated to form the first oxide layer.

Example 12. The photonic integrated circuit structure of any of examples 1-11, wherein the first silicon wafer is separated using ion implantation.

Example 13. The photonic integrated circuit structure of any of examples 1-12, wherein the first oxide layer and the second oxide layer are silicon oxide layers.

Example 14. The photonic integrated circuit structure of any of examples 1-13, wherein the photonic integrated circuit structure comprises multiple lanes, wherein each lane propagates one of a plurality of different wavelengths of light, and wherein the film of material is applied to different areas of the photonic integrated circuit structure that correspond to different lanes of the multiple lanes.

Example 15. A method of manufacturing a photonic integrated circuit structure formed from a first wafer and a second wafer, the method comprising: oxidizing the first wafer, the first wafer comprising a grating layer; depositing a film of material between the first wafer and the second wafer, the film of material having an index of refraction that is between a first index of refraction of oxide material of the first wafer and second index of refraction of material of the second wafer; bonding the first wafer to the second wafer to form a bonded structure; and separating the first wafer to form a silicon on insulator (SOI) wafer of the photonic integrated circuit structure, the film of material compensating for one or more etalons caused from light reflecting within the photonic integrated circuit structure.

Example 16. The method of manufacturing example 15, wherein the film of material is applied to the first wafer after oxidation of the first wafer.

Example 17. The method of manufacturing of any of examples 15 or 16, wherein the film of material is applied to the second wafer.

Example 18. The method of manufacturing of any of examples 15-17, further comprising processing the first wafer to cause a change in thickness of an oxide layer, wherein the film of material compensates for the change in thickness of the oxide layer by causing interference to occur of phase such that the one or more etalons are avoided in the photonic integrated circuit structure.

Example 19. The method of manufacturing of any of examples 15-18, wherein the photonic integrated circuit structure is configured to propagate light at a wavelength, and the film of material is deposited such that a thickness of the film of material is one-quarter of the wavelength.

Example 20. The method of manufacturing of any of examples 15-19, wherein the photonic integrated circuit structure is a wavelength division multiplexer having multiple lanes and the film of material is applied to areas corresponding to different lanes, each of the multiple lanes configured to propagate different wavelengths of light.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A photonic integrated circuit structure for transmitting light, the photonic integrated circuit structure comprising:
    a grating layer that propagates light, the grating layer being between a first oxide layer and a second oxide layer of the photonic integrated circuit structure;
    a mirror at a first side of the photonic integrated circuit structure, the mirror separated from the grating layer by the first oxide layer, the mirror to direct light from the grating layer towards a second side of the photonic integrated circuit structure that is opposite of the first side;
    a silicon layer at the second side of the photonic integrated circuit structure, the second oxide layer being between the silicon layer and the grating layer; and
    a film of material between the silicon layer and the second oxide layer to stop one or more etalons from occurring in the photonic integrated circuit structure by causing interference of light reflecting between the silicon layer and the second oxide layer to occur out of phase, the film of material having an index of refraction that is between indices of refraction of the silicon layer and the second oxide layer, wherein:
    the photonic integrated circuit structure is formed from a first silicon wafer and a second silicon wafer;
    the first wafer is processed to cause a change in thickness of the second oxide layer; and
    the film of material compensates for the change in thickness of the second oxide layer.

2. The photonic integrated circuit structure of claim 1, wherein the index of refraction of the film of material is a geometric mean of the indices of refraction of the silicon layer and the second oxide layer.

3. The photonic integrated circuit structure of claim 1, wherein the film of material has a thickness that is one-quarter of a wavelength of the light in the photonic integrated circuit structure.

4. The photonic integrated circuit structure of claim 1, wherein the film of material stops an etalon from occurring between: a first interface comprising the silicon layer and the second oxide layer, and a second interface comprising the grating layer and the second oxide layer.

5. The photonic integrated circuit structure of claim 1, wherein the film of material stops an etalon from occurring between: a reflective interface comprising the silicon layer and the second oxide layer, and the mirror.

6. The photonic integrated circuit structure of claim 1, wherein oxide material of the first oxide layer and the second oxide layer is created from oxidation of the first silicon wafer.

7. The photonic integrated circuit structure of claim 6, wherein the film of material is deposited on the first silicon wafer after oxidation of the first silicon wafer.

8. The photonic integrated circuit structure of claim 6, wherein the film of material is deposited on the second silicon wafer.

9. The photonic integrated circuit structure of claim 6, wherein the photonic integrated circuit structure is formed by bonding the first silicon wafer to the second silicon wafer.

10. The photonic integrated circuit structure of claim 9, wherein the first silicon wafer is separated to form the first oxide layer.

11. The photonic integrated circuit structure of claim 10, wherein the first silicon wafer is separated using ion implantation.

12. The photonic integrated circuit structure of claim 1, wherein the first oxide layer and the second oxide layer are silicon oxide layers.

13. The photonic integrated circuit structure of claim 1, wherein the photonic integrated circuit structure comprises multiple lanes, wherein each lane propagates one of a plurality of different wavelengths of light, and wherein the film of material is applied to different areas of the photonic integrated circuit structure that correspond to different lanes of the multiple lanes.

14. The photonic integrated circuit structure of claim 1, wherein the photonic integrated circuit structure is a wavelength division multiplexer having multiple lanes and the film of material is applied to areas corresponding to different lanes, each of the multiple lanes configured to propagate different wavelengths of light.

15. A method of manufacturing a photonic integrated circuit structure formed from a first wafer and a second wafer, the method comprising:
- oxidizing the first wafer, the first wafer comprising a grating layer;
- depositing a film of material between the first wafer and the second wafer, the film of material having an index of refraction that is between a first index of refraction of oxide material of the first wafer and second index of refraction of material of the second wafer;
- bonding the first wafer to the second wafer to form a bonded structure; and
- separating the first wafer to form a silicon on insulator (SOI) wafer of the photonic integrated circuit structure,
- the film of material stopping one or more etalons from occurring within the photonic integrated circuit structure by causing interference of light reflecting between the material of the second wafer and the oxide material of the first wafer to occur out of phase, wherein:
- the photonic integrated circuit structure is formed from a first silicon wafer and a second silicon wafer;
- the first wafer is processed to cause a change in thickness of the second oxide layer; and
- the film of material compensates for the change in thickness of the second oxide layer.

16. The method of manufacturing of claim 15, wherein the film of material is applied to the first wafer after oxidation of the first wafer.

17. The method of manufacturing of claim 15, wherein the film of material is applied to the second wafer.

18. The method of manufacturing of claim 15, wherein the photonic integrated circuit structure is configured to propagate light at a wavelength, and the film of material is deposited such that a thickness of the film of material is one-quarter of the wavelength.

* * * * *